US008660882B2

(12) United States Patent  
Bai et al.

(10) Patent No.: US 8,660,882 B2
(45) Date of Patent: Feb. 25, 2014

(54) MAXIMIZING RETAILER PROFIT AND CUSTOMER SATISFACTION USING MULTI-CHANNEL OPTIMIZATION

(75) Inventors: Xin Xin Bai, Beijing (CN); Jin Dong, Beijing (CN); Jing Gao, Beijing (CN); Ta-Hsin Li, Danbury, CT (US); Hai Rong Lv, Beijing (CN); Wen Jun Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/837,758

(22) Filed: Jul. 16, 2010

(65) Prior Publication Data

US 2012/0016716 A1 Jan. 19, 2012

(51) Int. Cl.
*G06Q 30/00* (2012.01)
*G06Q 10/00* (2012.01)

(52) U.S. Cl.
USPC ....... 705/7.29; 705/7.31; 705/7.35; 705/7.36; 705/7.37; 705/7.38

(58) Field of Classification Search
CPC ............. G06Q 30/0201; G06Q 30/02; G06Q 30/0202; G06Q 10/06375; G06Q 10/0639
USPC ............ 705/7.29, 7.31, 7.35, 7.36, 7.37, 7.38
See application file for complete search history.

(56) References Cited

U.S. PATENT DOCUMENTS

| | | | |
|---|---|---|---|
| 7,403,904 B2 * | 7/2008 | Abe et al. | 705/7.29 |
| 7,438,227 B2 * | 10/2008 | Keser et al. | 235/383 |
| 7,519,173 B2 * | 4/2009 | Flores et al. | 379/265.01 |
| 7,567,914 B2 * | 7/2009 | Bonissone et al. | 705/4 |
| 7,653,561 B2 * | 1/2010 | Bergstrom | 705/7.22 |
| 7,657,470 B1 * | 2/2010 | Delurgio et al. | 705/35 |
| 7,895,067 B2 * | 2/2011 | Ramakrishnan | 705/7.11 |
| 2002/0169657 A1 | 11/2002 | Singh et al. | |
| 2003/0036933 A1 * | 2/2003 | Shetty et al. | 705/7 |
| 2004/0015386 A1 * | 1/2004 | Abe et al. | 705/10 |
| 2004/0073496 A1 * | 4/2004 | Cohen | 705/26 |
| 2004/0093296 A1 * | 5/2004 | Phelan et al. | 705/36 |
| 2004/0264670 A1 * | 12/2004 | Flores et al. | 379/220.01 |
| 2005/0071218 A1 * | 3/2005 | Lin et al. | 705/10 |
| 2005/0149396 A1 * | 7/2005 | Horowitz et al. | 705/14 |
| 2007/0226082 A1 * | 9/2007 | Leal | 705/27 |
| 2008/0033859 A1 * | 2/2008 | Olsen | 705/36 R |
| 2008/0221949 A1 | 9/2008 | Delurgio et al. | |
| 2008/0249844 A1 * | 10/2008 | Abe et al. | 705/10 |
| 2010/0049679 A1 * | 2/2010 | Phillips | 706/15 |

(Continued)

OTHER PUBLICATIONS

Abe et al, Cross Channel Optimized Marketing by reinforcement learning, ACM 1-58113-888-1040008, Aug. 2004.*

(Continued)

*Primary Examiner* — Lynda Jasmin
*Assistant Examiner* — Octavian Rotaru
(74) *Attorney, Agent, or Firm* — Scully, Scott, Murphy & Presser, P.C.; Daniel P. Morris, Esq.

(57) ABSTRACT

A data integration module is operable to integrate a plurality of data sources, a customer preference module builds a model representing preference to different channels in merchandise category for each customer segment. A customer satisfaction module creates a model representing customer satisfaction metrics. A joint multi-channel optimization module is operable to use an optimization model that utilizes the customer preference model and the customer satisfaction model and maximize retailer's profit and customer satisfaction.

3 Claims, 5 Drawing Sheets

(56) References Cited

U.S. PATENT DOCUMENTS

2010/0057525 A1 3/2010 Wagner et al.
2010/0198680 A1* 8/2010 Ma et al. .................... 705/14.45
2010/0223099 A1 9/2010 Johnson et al.

OTHER PUBLICATIONS

Basak et al, Cross-channel customer mapping, 978-0-7695-3131-108, IEEE, 2008.*

Hallowell et al, The relationship of customer satisfaction, customer loyalty and profitability, International Journal of Service Industry Management, v7, p. 27-42, 1996.*

IBM, Business Consulting Services, Cross channel optimization—A strategic roadmap for multichannel retailers, Strategy and Change, IBM 2005 http://www-935.ibm.com/services/us/imc/pdf/ge510-6204-cross-channel-opt-exec-sum.pdf.*

IBM, Business Consulting Services, Cross-channel optimization, Retail, IBM 07, 2005 http://www-31.ibm.com/cn/services/bcs/iibv/pdf/g510-6186-cross-channel-retailer.pdf.*

Zentes et al, Strategic Retail Management, ISBN 978-3-8349-0287-0, Gabler, 2007 (selection).*

Mohammad Syed, A Relational Study on Automated Service Quality, Consumer Satisfaction and Financial Performance, Indepedent University Bangladesh webpages, Aug. 24, 2006 http://sb.iub.edu.bd/internship/summer2006/0320454.pdf.*

Danforth Ben, Variance-Covariance Matrix, University of North Carolina webpages, Jun. 1, 2009 http://www.unc.edu/~jjharden/methods/vcv_week3.pdf.*

Covariance Matrix, aiaccess webpages, reireived from archives org Mar. 29, 2012, published Apr. 3, 2009 http://www.aiaccess.net/English/Glossaries/GlosMod/e_gm_covariance_matrix.htm.*

Varian, Hal R, Microeconomics Analysis, third edition, ISBN 0-393-95735-7, W W Norton and Company, 1992.*

U.S. Official Action mailed Jul. 6, 2012 in related U.S. Appl. No. 12/859,028.

* cited by examiner

FIG. 1

| TRANSACTION ID | STORE/CHANNEL ID | TIME | MEMBER ID | MERCHANDISE ID | AMOUNT | PRICE |
|---|---|---|---|---|---|---|
| 1 | P01 | 20070101102355 | M01 | 01 | 2 | 3.50 |
| 1 | P01 | 20070101102355 | M01 | 03 | 1 | 1.35 |
| 2 | W01 | 20070101102355 | | 02 | 5 | 5.75 |
| 3 | P02 | 20070101102355 | M02 | 02 | 10 | 5.75 |
| 3 | P02 | 20070101102355 | M02 | 03 | 1 | 1.35 |
| 3 | P02 | 20070101102355 | M02 | 04 | 1 | 20.00 |

FIG. 2

| CHANNEL | MERCHANDISE CATEGORY | | | | | | | | |
|---|---|---|---|---|---|---|---|---|---|
| | BASIC APPAREL | | | PERSONAL CARE PRODUCTS | | | ELECTRONICS | | |
| | EVER VISITED | MOST VISITED | MOST LIKED | EVER VISITED | MOST VISITED | MOST LIKED | EVER VISITED | MOST VISITED | MOST LIKED |
| PHYSICAL STORE | 1 | 1 | 1 | | | | 1 | 1 | |
| WEB SITE/INTERNET | 1 | | | 1 | | 1 | 1 | 1 | 1 |
| CATALOG | 1 | | | 1 | 1 | | 1 | | |

FIG. 3a

| CHANNEL | MERCHANDISE CATEGORY | | |
|---|---|---|---|
| | BASIC APPAREL | | |
| | EVER VISITED | MOST VISITED | MOST LIKED |
| PHYSICAL STORE | 50 | 30 | 15 |
| WEB SITE/INTERNET | 49 | 24 | 15 |
| CATALOG | 34 | 15 | 10 |

MAXIMIZING RETAILER PROFIT AND CUSTOMER SATISFACTION USING MULTI-CHANNEL OPTIMIZATION

FIELD OF THE INVENTION

The present disclosure relates to retail industry configuration and more particularly to joint multi-channel configuration optimization for retail industry.

BACKGROUND OF THE INVENTION

Big retail companies use multiple channels to sell their merchandise. Multiple channels include physical stores, web sites, catalogs, etc. The industry continues to invest heavily to sustain and renew these channels. But multi-channel retailers are facing the challenge of optimizing configuration of multiple channels for improved revenue and customer satisfaction (CSAT) performance. Most retailers do not understand the inter-dependence of multiple channels and are not benefiting from it. Consumers are still unsatisfied with perceived homogenous retail offerings through multiple channels.

Accordingly, it is desirable to have a system and method that considers various channels, inter-dependence of those channels in providing more profitable retail plans.

BRIEF SUMMARY OF THE INVENTION

A method and system for joint multi-channel configuration optimization for retail industry are provided. The method, in one aspect, may include integrating a plurality of data sources, generating from said integrated data sources, a customer preference model representing preference to different channels in merchandise category for each customer segment. The method may also include generating a customer satisfaction model representing customer satisfaction metrics, and maximizing retailer's profit and customer satisfaction using an optimization model that utilizes said customer preference model and said customer satisfaction model.

In another aspect, the method may further include generating a channel influence model representing influence on a channel on another channel, and the step of maximizing may include maximizing retailer's profit and customer satisfaction using an optimization model that utilizes said customer preference model, said channel influence model, and said customer satisfaction model.

A system for joint multi-channel configuration optimization for retail industry, one aspect, may include a data integration module operable to integrate a plurality of data sources. A customer preference module may be operable to build a customer preference model representing preference to different channels in merchandise category for each customer segment. A customer satisfaction module may be operable to build a customer satisfaction model representing customer satisfaction metrics. A joint multi-channel optimization module may be operable to use an optimization model that utilizes said customer preference model, said channel influence model, and said customer satisfaction model and maximize retailer's profit and customer satisfaction.

In another aspect, the system may further include a channel influence module operable to build a channel influence model representing influence on a channel on another channel, and the joint multi-channel optimization module may be operable to use an optimization model that utilizes said customer preference model, said channel influence model, and said customer satisfaction model and maximize retailer's profit and customer satisfaction.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A decision-support tool optimizes multi-channel configuration plan to take advantage of the inter-channel dependency and to improve revenue and CSAT simultaneously. Optimization methods may include combining cross-channel data (e.g., merchandise associations, cross-selling) with intra-channel data (e.g., sales metrics, transactions, member information of a given channel) and external data (demographic data in city/region), together with multi-channel CSAT data (survey of customer preference for channels by category). The tool may also maximize both revenue and CSAT by simultaneous selection of the right channel configuration with right merchandise mix, right pricing level and right service level. A platform is provided to solve the problem effectively and efficiently.

Figure 1:
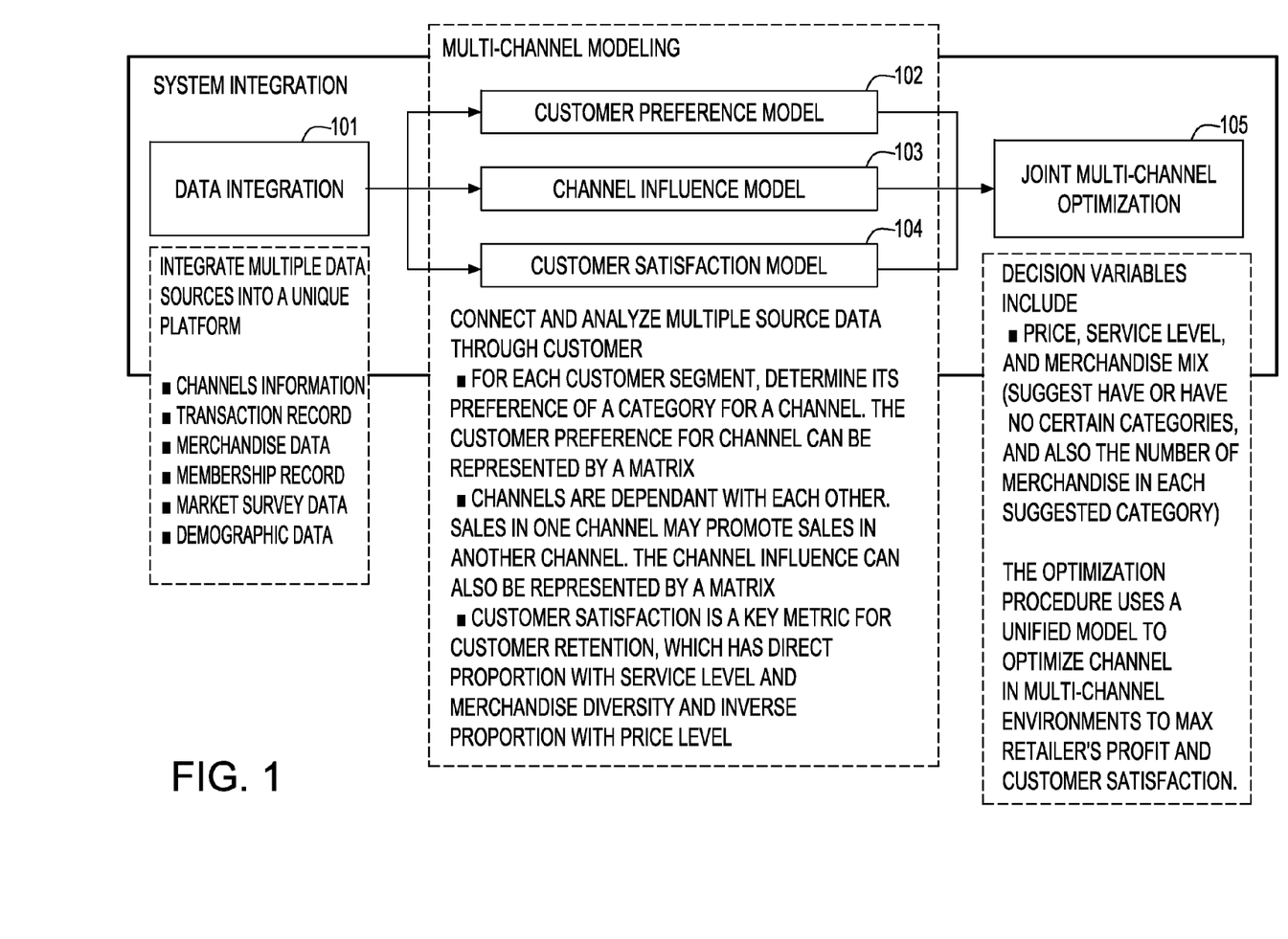
FIG. 1 illustrates the overview of the system including the five functional modules.

In one embodiment, the system implementing multi-channel optimization may include five functional modules: data integration, customer preference model, channel influence model, customer satisfaction model, and joint multi-channel optimization. FIG. 1 illustrates the overview of the system including the five functional modules which will be described below.

Data Integration functional module or component (101) integrates and analyzes multiple data sources, for example, to support more reliable multi-channel optimization. The data sources may include: channel information, transaction record, merchandise data, membership record, market survey data and demographic data. The original data may be presented in different formats, e.g., paper format. After data integration, all data are organized in data table format or another structured format that is stored in a memory device readable by a computer or a processor.

Figure 2:
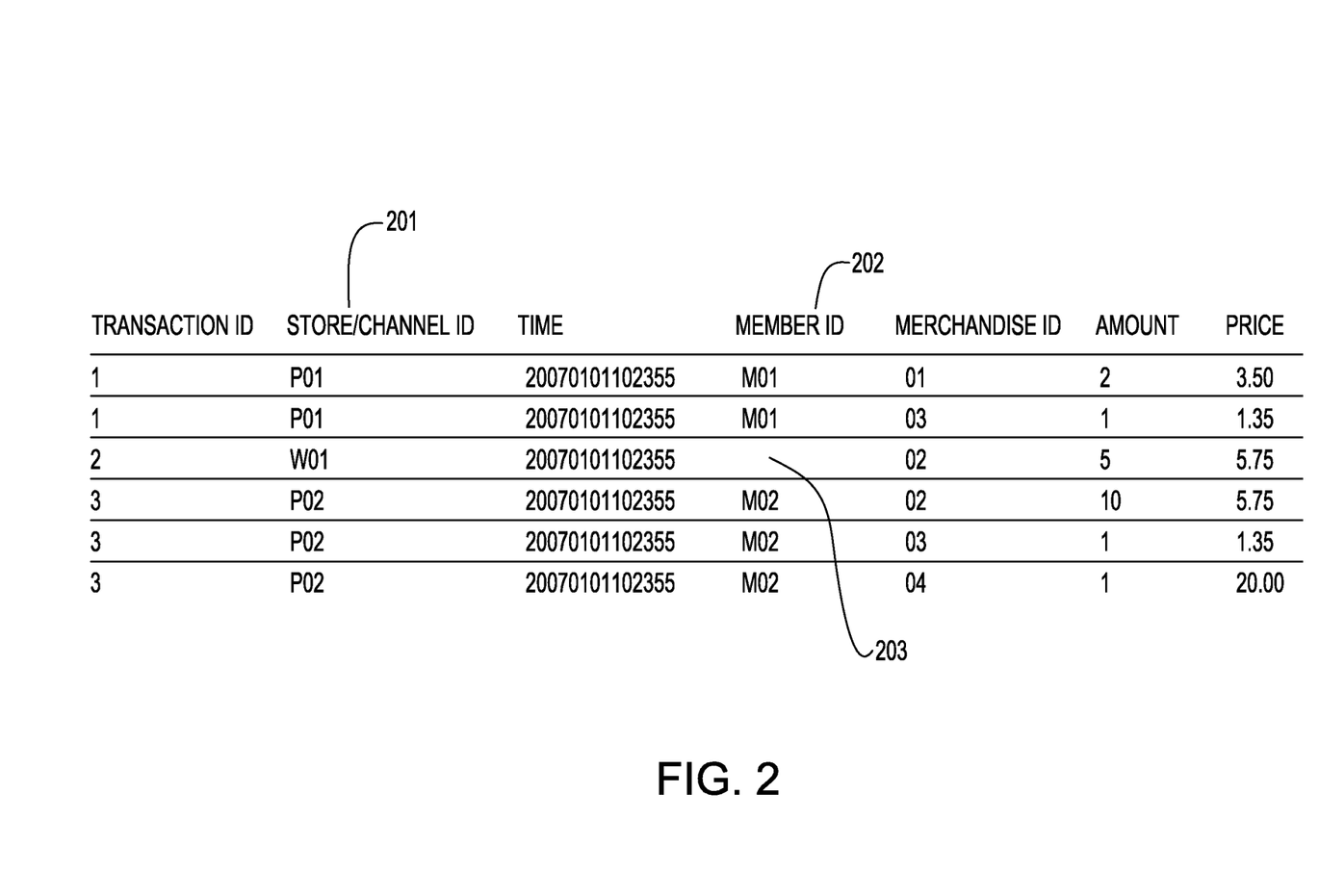
FIG. 2 shows an example of the transaction record data table.

FIG. 2 shows an example of the transaction record data table. An entry in transaction record data table has multiple attributes, e.g. store/channel ID (201), member ID (202). Some attributes may be missed, i.e., left blank, for instance, as shown at (203). The data tables are stored in database (e.g. DB2), for instance, so that different data sources can be connected and analyzed together more efficiently.

Referring back to FIG. 2, Customer Preference Model (102) builds customer preference data into a form usable for optimization. Customer preference represents the customers' relative preferences to different channels in each merchandise category. Since different customers have different shopping preferences, the customer preference is related to the customer segments. Customer segments refer to group of customers that share some factors or attributes such as age group, gender group, other demographic group, marital status, number of children, income level, etc. Here, it is assumed that customers in the same customer segment have similar customer preferences. For each customer segment, the method and system of the present disclosure in one embodiment determine its preference of a category for a channel.

In one embodiment, the customer preference of a customer segment can be represented by a matrix. For instance, $C_k$ is a matrix that represents the customer preference of the k-th customer segment. $C_k[m,n]$ means preference of m-th merchandise category for n-th channel. It is set to 1 for physical stores, the preference matrices can be set via statistics on shop survey data.

Figure 3A:
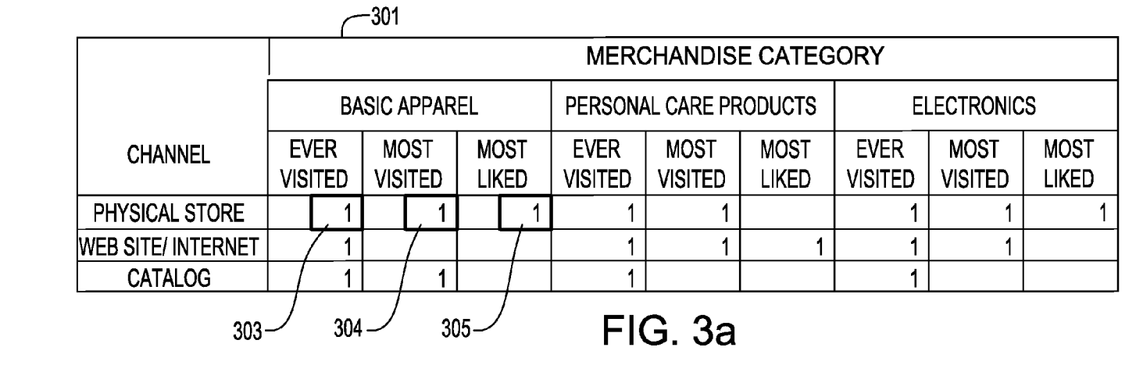
FIG. 3a and FIG. 3b show examples of shop survey paper.

FIG. 3a shows an example of shop survey paper (301). In this example, there are three types of channels: physical store (e.g., brick and mortar), internet, and catalog. An individual shopper is asked to fill the survey table (301). Take basic apparel for example, when one wants to buy basic apparel, if he has ever visited the physical store, then mark the corresponding grid (303) with "1"; if the physical store is among his most visited channels, then mark grid (304) with "1"; if the physical store is his most liked channel for this category (i.e., basic apparel), grid (305) will be marked with "1". Other grid can be filled in the same manner. It is also possible to use different structure to convey the same information.

Figure 3B:
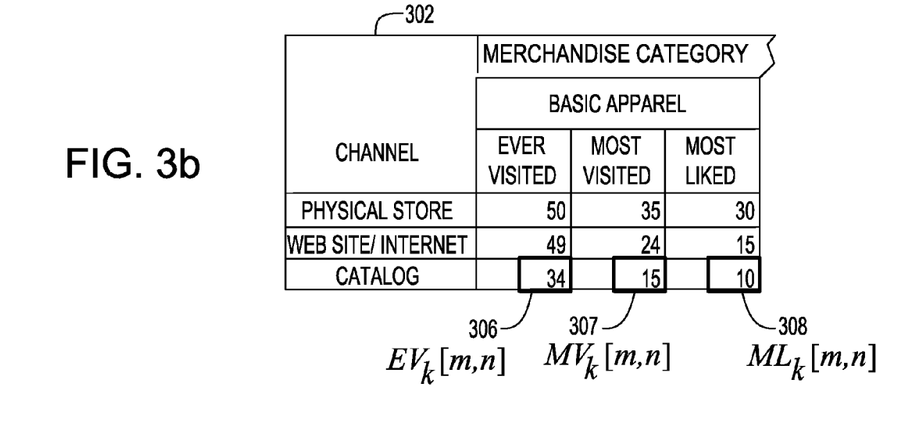

To compute the k-th customer segment's preference matrix, select the survey data that belongs to this customer segment and get the statistics of this segment (302), for example shown at FIG. 3b. $EV_k[m,n]$ (306) is the statistics of ever visited channel, $MV_k[m,n]$ (307) is the statistics of most visited channel, and $ML_k[m,n]$ (308) is the statistics of most liked channel. Here, m refers to m-th merchandise, and n refers to n-th channel.

Suppose physical store is the $1^{st}$ channel and $1^{st}$ merchandise category has the maximum prefer[1,n], then we set $C_k[1,1]=1$, and $C_k[m,n]=prefer_k[m,n]/prefer_k[1,1]$.

Where, $prefer_k[m,n]=EV_k[m,n]*0.3+MV_k[m,n]*0.5+ML_k[m,n]*0.7$

Here, "prefer" is a measure of customers' preference. For example, when other conditions are the same, the customer will choose the channel with the highest "prefer" value. "prefer" is calculated as a weighted sum of survey results.

Referring to FIG. 1, Channel Influence Model (103) builds dependencies or impact between and among the channels. For instance, channels are dependent on each other. The sales of a category in one channel may influence the sales of another category in another one channel, we call this channel influence. Channel influence may be represented by a matrix $U_{i,j}$, which means the channel influence between channel i and channel j. The element $U_{i,j}[p,q]$ means the influence from p-th category in channel i to q-th category in channel j. $U_{i,j}[p,q]>0$ means sales of p-th category in channel i will promote sales of q-th category in channel j. $U_{i,j}[p,q]<0$ means sales of p-th category in channel i will suppress sales of q-th category in channel j. $U_{i,j}$ can be set via combining association rules mining results across channels at category level with expert knowledge. Thus, for example, the matrix $U_{i,j}$ may be computed by data mining techniques. An element in the matrix represents the association level of the two corresponding categories.

For instance, based on member information and their transaction history with multi-channel behavior, we get the cross channel association rules:

$$associ_{i,j}[p,q] = \frac{P\left(\begin{array}{l}\text{bought } p\text{-th category at } chnnel\ i \text{ and} \\ q\text{-th category at channel } j\end{array}\right)}{P(\text{bought } p\text{-th category at channel } i)}$$

This formulation represents the conditional probability, i.e., the probability that one customer will buy q-th category at channel j when he/she has bought p-th category at channel i. The meanings of numerator and denominator can be seen from the formulation.

Expert knowledge may be leveraged to identify the key sales promotion effect of p-th category at channel i to q-th category at channel j based on mined rules, i.e., $U_{i,j}[p,q]=pw_{i,j}[p,q]\times associ_{i,j}[p,q]$ Here, $pw_{i,j}[p,q]$ is the mapping coefficient related to expert knowledge. For many $pw_{i,j}[p,q]$, they are set to 0. In one embodiment, only for key sales promotion effect, the corresponding $pw_{i,j}[p,q]$ is non-zero. For example, if we are sure that when a customer bought a TV set, he/she may be willing to buy a DVD player. Then we set $pw_{i,j}[p,q]$ to be a big value, a non-zero value.

Figure 4A:
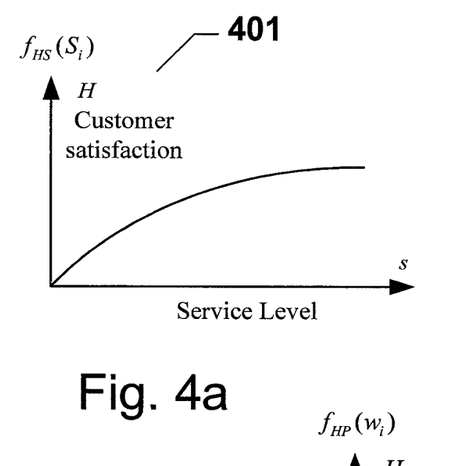
FIGS. 4a-4c show examples of $f_{HS}(x)$ (401), $f_{HI}(x)$ (402), and $f_{HP}(x)$ (403).
Figure 4B:
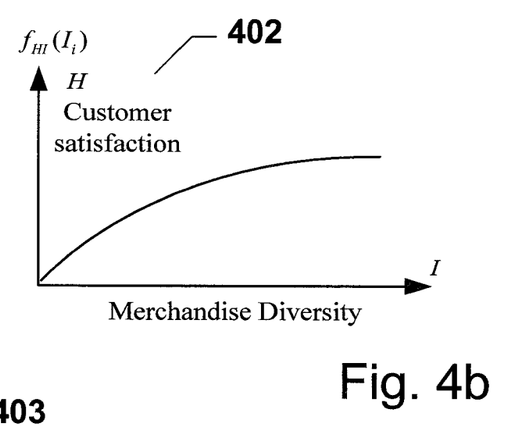
Figure 4C:
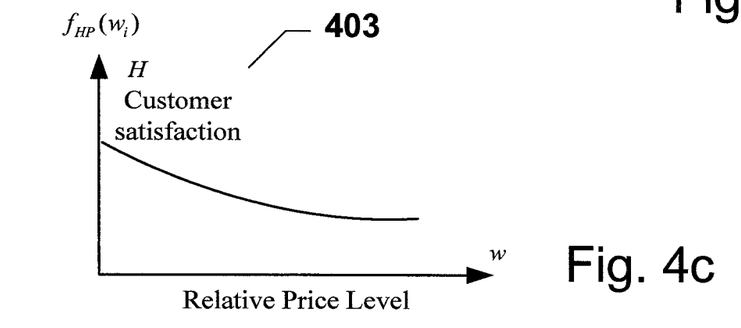

Customer Satisfaction Model (104) identifies and builds a customer satisfaction metric. Customer satisfaction measures if customers are satisfied with a channel or channel combination. It is represented by a function $H(I_1, \ldots, I_N, w_1, \ldots, w_N, S_1, \ldots, S_N)$, has direct proportion with service level ($S_i$), inverse proportion with relative price level ($w_i$), and also relative to the number of merchandises in some category for some channel ($I_i$, more diversity, more customer satisfaction).

$$H(I_1, \ldots, I_N, w_1, \ldots, w_N, S_1, \ldots, S_N) = \sum_{i}^{N} H_i(I_i, w_i, S_i)$$

$$H_i(I_i, w_i, S_i) = \frac{f_{HI}(I_i[j]) \times f_{HP}(w_i[j]) \times f_{HS}(S_i)}{\sum_{i=1}^{N}(f_{HI}(I_i[j]) \times f_{HP}(w_i[j]) \times f_{HS}(S_i))}$$

Where $f_{HP}(x)$ are decreasing functions, while $f_{HI}(x)$ and $f_{HS}(x)$ are increasing functions. These functions can be set by surveys and experiences. FIGS. 4a, 4b, and 4c show examples of $f_{HS}(x)$ (401), $f_{HI}(x)$ (402), and $f_{HP}(x)$ (403), respectively.

In the above formulation $f_{HP}(x)$ represents the relationship between customer satisfaction and relative price level. $f_H(x)$ represents the relationship between customer satisfaction and merchandise diversity. $f_{HS}(x)$ represents the relationship between customer satisfaction and service level. $f_{HI}(x)$ represents the relationship between customer satisfaction and merchandise diversity. $f_{HS}(x)$ represents the relationship between customer satisfaction and relative price level.

Joint Multi-Channel Optimization (105) implements multi-channel optimization problem under the situation that no constraints is set, e.g., investment cost limitation. For instance, if there is an limit of investment cost, then the sales category should be bounded. In such cases, the optimization problem may be solved under the constraint of cost. The example model shown below considers the unconstrained optimization problem. The optimization procedure may use a unified model to optimize channel mix in multi-channel environments to maximize retailer's profit and customer satisfaction. Decision variables may include price, service level, and merchandise mix.

First, we introduce some notations in the optimization model.

Optimization Variables:

$\{I_i[j], w_i[j], S_i) | i=1, 2, \ldots, N; j=1, 2, \ldots, M\}$ (N means total number of channels; M means total number of categories)

$I_i[j]$: number of merchandise in j-th category for the i-th channel, illustrates merchandise diversification $w_i[j]$: relative price level of j-th category for the i-th channel, $w_i[j]=1$ means original price, $w_i[j]$ has lower and upper bound, e.g. [0.5, 1.5]. In the optimization model, the price has been normalized. Hence, 0.5 and 1.5 give the bound of reasonable price, i.e., 0.5 means the products are sold at half of the original price, 1.5 means the products are sold at a price 50% higher than the original price.

$S_i$: service level of the i-th channel, it is a collective or comprehensive metric of service (environment, distribution, etc.), continuous value in [0,1], where 0 means the worst service, 1 means the best service.

Parameters/Input:

$C_k$: customer preference of the k-th customer segment, which has been introduced in (102).

$D_k[j]$: total demand of customer segment k for merchandise category j in the area (e.g., city) that is considered. This value may be worked out or computed in advance, for example, by combining market research and statistic bureau's demographic data.

$U_{i,j}$: cross-channel influence matrix between channel i and j, which has been in introduced in (103).

In one embodiment, the final optimization objective is a combination of profit and customer satisfaction:

$$\max \left[ \sum_{i=1}^{N} \sum_{j=1}^{M} ((w_i[j] \times P_j - \text{Cost}_i[j]) \times \text{Sale}_i[j] - L_i) + w \times H(I_1, \ldots, I_N, w_1, \ldots, w_N, S_1, \ldots, S_N) \right]$$

Here, $H(I_1, \ldots, I_N, w_1, \ldots, w_N, S_1, \ldots, S_N)$ is the customer satisfaction function, which has been introduced in (104); w is the weight of customer satisfaction, which may be set by survey or experience or other like methods. $P_j(j=1, 2, \ldots, M)$ is the average price of j-th category; $L_i$ is the operational cost of channel i, relative with the channel type, merchandise number and service level, etc; $\text{Cost}_i[j]$ is the average purchase price of category j in channel i.

$\text{Sales}_i[j]$ may be computed as follows. $\text{Sale}_i[j]$ is the sales of the j-th category in i-th channel. If we do not consider the cross-channel influence:

$$\text{Sale}_i[j]^1 = \sum_{k=1}^{N} (\alpha_k[i, j] \times D_k[j])$$

Here, $$\alpha_k[i, j] = \frac{C_k[i, j] \times f_P(w_i[j]) \times f_S(S_i)}{\sum_{i=1}^{N} (C_k[i, j] \times f_P(w_i[j]) \times f_S(S_i))},$$

which means the quota that k-th customer segment gets in i-th channel from $D_k[j]$, $f_P(x)$ is a decreasing function and $f_S(x)$ is a increasing function, which can be set by survey and experience. Each customer segment k has total demand $D_k[j]$ for j-th category and $\alpha_k[i,j] \times D_k[j]$ is the sales of the j-th category in i-th channel from customer segment k, so the total sales to the N customer segments is equal to $$\text{Sale}_i[j]^1 = \sum_{k=1}^{N} (\alpha_k[i, j] \times D_k[j]).$$

When cross-channel influence $U_{i,j}$ is taken into consideration, the final sales can be formulated by:

$$\text{Sale}_j[q] = \text{Sale}_j[q]^1 + \sum_{i \neq j} \sum_{p=1}^{M} \text{Sale}_i[p]^1 \times U_{i,j}[p, q]$$

Here, $\text{Sale}_j[q]^1$ is the sales without considering cross-channel influence. The remaining term is a combination of sales due to cross-channel influence.

This is a empirical formula, $\text{Sale}_j[q]^1$ is the sales without considering cross-channel influence, while adding the cross-channel influence $$\sum_{i \neq j} \sum_{p=1}^{M} \text{Sale}_i[p]^1 \times U_{i,j}[p, q],$$

we get the final sales $\text{Sale}_j[q]$, which means the sales of the q-th category in i-th channel.

The optimization problem can be solved by any of the optimization algorithm, e.g., genetic algorithm (GA) and/or Tabu search technique. Various data collected and computed in the present disclosure may be stored in memory, for instance, for a processor to operate upon. The merchandise referred to herein in this disclosure may include product items as well as services.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
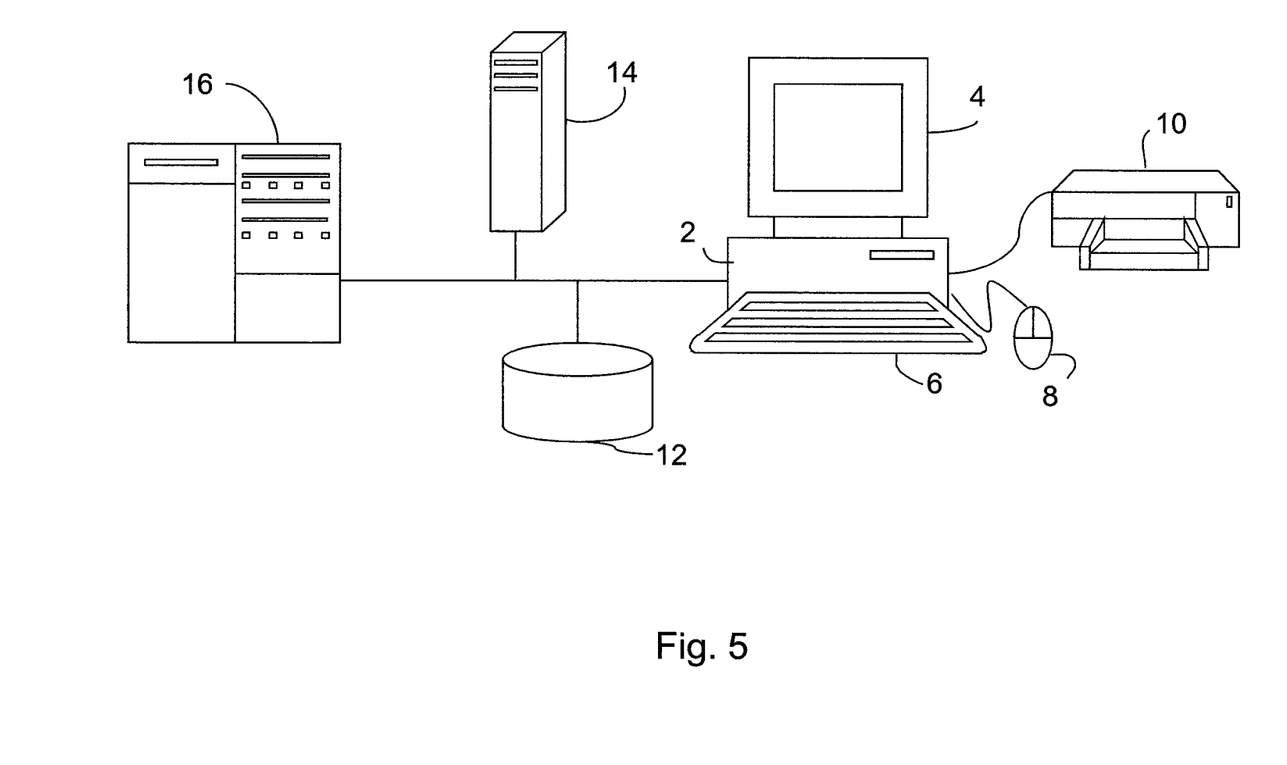
FIG. 5 illustrates an example of computer system architecture and network via which the systems and methodologies of the present disclosure may be carried out or executed.

Referring now to FIG. 5, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method to optimize joint multi-channel configuration for a retailer to maximize both profit and customer satisfaction in retail industry, comprising:

integrating a plurality of data sources comprising: channel information, transaction record, merchandise data, membership record, market survey data and demographic data;

generating, from the integrated data sources, a customer preference matrix $C_k$, representing a preference of a $k^{th}$ customer segment having at least one customer, of a plurality of customer segments, for a $j^{th}$ merchandise category from j mathematical natural and ordinal distributed merchandise categories, in an $i^{th}$ channel of a plurality of i mathematical natural and ordinal distributed channel types comprising at least two of: a brick and mortar channel, an internet channel, and a catalog channel;

generating, by a hardware processor, a mathematic expression of customer satisfaction $H_i$ as a function of:
a number of merchandise for the $i^{th}$ channel represented as $I_i$,
a relative price level for the $i^{th}$ channel represented as $w_i$, and
a service level for the $i^{th}$ channel represented as $S_i$ using a mathematical equation of form $$H_i(I_i, w_i, S_i) = \frac{f_{HI}(I_i[j]) \times f_{HP}(w_i[j]) \times f_{HS}(S_i)}{\sum_{i=1}^{N}(f_{HI}(I_i[j]) \times f_{HP}(w_i[j]) \times f_{HS}(S_i))}$$

wherein,
$I_i[j]$ represents the number of merchandise of the $j^{th}$ merchandise category in the $i^{th}$ channel,
$w_i[j]$ represents the relative price level of the $j^{th}$ merchandise category in the $i^{th}$ channel,
$f_{HI}$ is a first increasing function of customer satisfaction to merchandise diversity,
$f_{HP}$ is a decreasing function of customer satisfaction to the relative price level, and
$f_{HS}$ is a second increasing function of customer satisfaction to the service level;

maximizing, by the hardware processor, both the retailer's profit and the customer satisfaction, using a second mathematical equation of form $$\max\left[\sum_{i=1}^{N}\sum_{j=1}^{M}((w_i[j] \times P_j - Cost_i[j]) \times Sale_i[j] - L_i) + w \times H(I_1, \ldots, I_N, w_1, \ldots, w_N, S_1, \ldots, S_N)\right]$$

wherein,
$P_j$ is an average price paid for the $j^{th}$ merchandise category,
$Cost_i[j]$ is an average purchase price paid for the $j^{th}$ merchandise category in $i^{th}$ channel,
$L_i$ is an operational cost of the $i^{th}$ channel, relative to the channel types, the number of merchandise and the service level,
$w \times H(I_1, \ldots, I_N, w_1, \ldots, w_N, S_1, \ldots, S_N)$ is the mathematic expression of the customer satisfaction weighted by a customer satisfaction weight represented as w, Sales$_i$[j] is a cumulative sales of the j$^{th}$ merchandise category in i$^{th}$ channel, computed as an addition between:
- a first sale without cross-channel influence, expressed as a demand of the j$^{th}$ merchandise category adjusting a first sum of a ratio between a mathematical product of $C_k$, a second decreasing function of the $w_i$[j], and a third increasing function of the $S_i$ applied to k$^{th}$ customer segment, to a second sum of the mathematical product of $C_k$, the second decreasing function of the $w_i$[j] and, the third increasing function of the $S_i$ applied across the plurality of the i channel types and to the plurality of the customer segments, and
- a second sale with cross-channel optimization expressed as a third sum of sales of other merchandise categories multiplied by a cross channel influence matrix between the j merchandise categories with respect to the plurality of the i channel types.

2. A system to optimize joint multi-channel configuration for a retailer to maximize both profit and customer satisfaction in retail industry, the system comprising: one or more processor components programmed to:

integrating a plurality of data sources comprising: channel information, transaction record, merchandise data, membership record, market survey data and demographic data;

generating, from the integrated data sources, a customer preference matrix $C_k$, representing a preference of a k$^{th}$ customer segment having at least one customer, of a plurality of customer segments, for a j$^{th}$ merchandise category from j mathematical natural and ordinal distributed merchandise categories, in an i$^{th}$ channel of a plurality of i mathematical natural and ordinal distributed channel types comprising at least two of: a brick and mortar channel, an internet channel, and a catalog channel;

generating, a mathematic expression of customer satisfaction $H_i$ as a function of:
- a number of merchandise for the i$^{th}$ channel represented as $I_i$,
- a relative price level for the i$^{th}$ channel represented as $w_i$, and
- a service level for the i$^{th}$ channel represented as $S_i$ using a mathematical equation of form $$H_i(I_i, w_i, S_i) = \frac{f_{HI}(I_i[j]) \times f_{HP}(w_i[j]) \times f_{HS}(S_i)}{\sum_{i=1}^{N}(f_{HI}(I_i[j]) \times f_{HP}(w_i[j]) \times f_{HS}(S_i))}$$

wherein,
$I_i$[j] represents the number of merchandise of the j$^{th}$ merchandise category in the i$^{th}$ channel,
$w_i$[j] represents the relative price level of the j$^{th}$ merchandise category in the i$^{th}$ channel,
$f_{HI}$ is a first increasing function of customer satisfaction to merchandise diversity,
$f_{HP}$ is a decreasing function of customer satisfaction to the relative price level, and
$f_{HS}$ is a second increasing function of customer satisfaction to the service level;

maximizing, both the retailer's profit and the customer satisfaction, using a second mathematical equation of form $$\max\left[\sum_{i=1}^{N}\sum_{j=1}^{M}((w_i[j] \times P_j - Cost_i[j]) \times Sale_i[j] - L_i) + w \times H(I_1, \ldots, I_N, w_1, \ldots, w_N, S_1, \ldots, S_N)\right]$$

wherein,
$P_j$ is an average price paid for the j$^{th}$ merchandise category,
$Cost_i$[j] is an average purchase price paid for the j$^{th}$ merchandise category in i$^{th}$ channel,
$L_i$ is an operational cost of the i$^{th}$ channel, relative to the channel types, the number of merchandise and the service level,
$w \times H(I_1, \ldots, I_N, w_1, \ldots, w_n, S_1, \ldots, S_N)$ is the mathematic expression of the customer satisfaction weighted by a customer satisfaction weight represented as w,
Sales$_i$[j] is a cumulative sales of the j$^{th}$ merchandise category in i$^{th}$ channel, computed as an addition between:
- a first sale without cross-channel influence, expressed as a demand of the j$^{th}$ merchandise category adjusting a first sum of a ratio between a mathematical product of $C_k$, a second decreasing function of the $w_i$[j], and a third increasing function of the $S_i$ applied to k$^{th}$ customer segment, to a second sum of the mathematical product of $C_k$, the second decreasing function of the $w_i$[j] and, the third increasing function of the $S_i$ applied across the plurality of the i channel types and to the plurality of the customer segments, and
- a second sale with cross-channel optimization expressed as a third sum of sales of other merchandise categories multiplied by a cross channel influence matrix between the j merchandise categories with respect to the plurality of the i channel types.

3. A non-transitory computer readable storage medium to optimize joint multi-channel configuration for a retailer to maximize both profit and customer satisfaction in retail industry, on which is recorded computer executable instructions that, when executed by a processor, cause the processor to execute the steps of a method comprising:

integrating a plurality of data sources comprising: channel information, transaction record, merchandise data, membership record, market survey data and demographic data;

generating, from the integrated data sources, a customer preference matrix $C_k$, representing a preference of a k$^{th}$ customer segment having at least one customer, of a plurality of customer segments, for a j$^{th}$ merchandise category from j mathematical natural and ordinal distributed merchandise categories, in an i$^{th}$ channel of a plurality of i mathematical natural and ordinal distributed channel types comprising at least two of: a brick and mortar channel, an internet channel, and a catalog channel;

generating, a mathematic expression of customer satisfaction $H_i$ as a function of:
- a number of merchandise for the i$^{th}$ channel represented as $I_i$,
- a relative price level for the i$^{th}$ channel represented as $w_i$, and
- a service level for the i$^{th}$ channel represented as $S_i$ using a mathematical equation of form $$H_i(I_i, w_i, S_i) = \frac{f_{HI}(I_i[j]) \times f_{HP}(w_i[j]) \times f_{HS}(S_i)}{\sum_{i=1}^{N} (f_{HI}(I_i[j]) \times f_{HP}(w_i[j]) \times f_{HS}(S_i))}$$

wherein, $I_i[j]$ represents the number of merchandise of the $j^{th}$ merchandise category in the $i^{th}$ channel, $w_i[j]$ represents the relative price level of the $j^{th}$ merchandise category in the $i^{th}$ channel, $f_{HI}$ is a first increasing function of customer satisfaction to merchandise diversity, $f_{HP}$ is a decreasing function of customer satisfaction to the relative price level, and $f_{Hs}$ is a second increasing function of customer satisfaction to the service level;

maximizing, both the retailer's profit and the customer satisfaction, using a second mathematical equation of form $$\max\left[\sum_{i=1}^{N}\sum_{j=1}^{M}((w_i[j] \times P_j - Cost_i[j]) \times Sale_i[j] - L_i) + w \times H(I_1, \ldots, I_N, w_1, \ldots, w_N, S_1, \ldots, S_N)\right]$$

wherein, $P_j$ is an average price paid for the $j^{th}$ merchandise category, $Cost_i[j]$ is an average purchase price paid for the $j^{th}$ merchandise category in $i^{th}$ channel, $L_i$ is an operational cost of the $i^{th}$ channel, relative to the channel types, the number of merchandise and the service level, $w \times H(I_1, \ldots, I_N, w_1, \ldots, w_N, S_1, \ldots, S_N)$ is the mathematic expression of the customer satisfaction weighted by a customer satisfaction weight represented as w, $Sales_i[j]$ is a cumulative sales of the $j^{th}$ merchandise category in $i^{th}$ channel, computed as an addition between:

a first sale without cross-channel influence, expressed as a demand of the $j^{th}$ merchandise category adjusting a first sum of a ratio between a mathematical product of $C_k$, a second decreasing function of the $w_i[j]$, and a third increasing function of the $S_i$ applied to $k^{th}$ customer segment, to a second sum of the mathematical product of $C_k$, the second decreasing function of the $w_i[j]$ and, the third increasing function of the $S_i$ applied across the plurality of the i channel types and to the plurality of the customer segments, and a second sale with cross-channel optimization expressed as a third sum of sales of other merchandise categories multiplied by a cross channel influence matrix between the j merchandise categories with respect to the plurality of the i channel types.

* * * * *